United States Patent [19]

Chung

[11] Patent Number: 4,844,920
[45] Date of Patent: Jul. 4, 1989

[54] FOOD WRAPPER ARTICLE

[76] Inventor: Jing-Yau Chung, 13310 Pebblebrook, Houston, Tex. 77079

[21] Appl. No.: 56,105

[22] Filed: Jun. 1, 1987

[51] Int. Cl.$^4$ ............................................. A23L 1/322
[52] U.S. Cl. ........................................ 426/94; 426/92; 426/138; 426/144; 426/283; 426/284; 426/439
[58] Field of Search ............... 426/104, 138, 139, 143, 426/144, 282, 283, 284, 94, 502, 297, 92, 439

[56] References Cited

U.S. PATENT DOCUMENTS

| | | | |
|---|---|---|---|
| 1,717,401 | 6/1929 | Perky | 426/144 |
| 2,132,690 | 10/1938 | Hilliard | 426/144 |
| 3,172,372 | 3/1965 | Packman | 426/297 |
| 3,219,456 | 11/1965 | Matz et al. | 426/297 |
| 3,798,343 | 3/1974 | Vitale | 426/297 |
| 4,183,966 | 1/1980 | Mickle et al. | 426/243 |
| 4,438,145 | 3/1984 | Bakker | 426/297 |
| 4,491,601 | 1/1985 | Bernal | 426/439 |
| 4,569,848 | 2/1986 | Giorgette et al. | 426/94 |

FOREIGN PATENT DOCUMENTS 386988   1/1933   United Kingdom ................ 426/138

Primary Examiner—Donald E. Czaja
Assistant Examiner—Mary S. Mims
Attorney, Agent, or Firm—Baker, Kirk & Bissex

[57] ABSTRACT

A fried food article having improved crispness. Inner and outer pastry shells are provided, the inner shell sealedly containing a desired filling, and the outer shell being disposed thereabouts. Means are provided in the outer shell design for decreasing deep frying time to achieve desired outer shell crispness while avoiding undesirable drying out of the filling. In one embodiment, such means takes the form of a plurality of apertures in the outer shell to facilitate frying oil substantially contacting both the inner and outer surfaces of the outer shell. In an alternate embodiment, spacing means are provided alone or in combination with the apertures providing heat insulation between the inner and outer shells in the former case, and additional space for hot oil in the latter case, both to enance the resultant crispness of the food article upon frying.

10 Claims, 2 Drawing Sheets

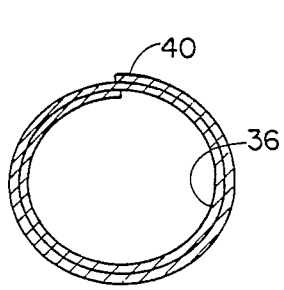
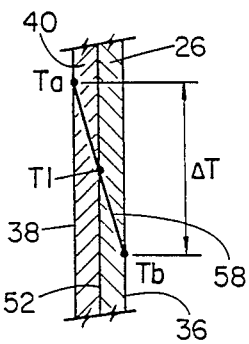
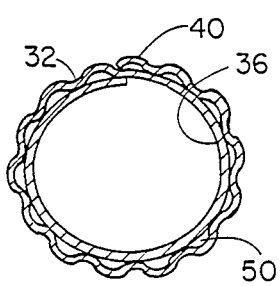
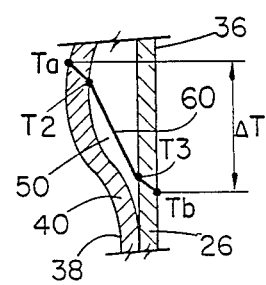
PRIOR ART
FIG. 5    FIG. 5A    FIG. 6    FIG. 6A
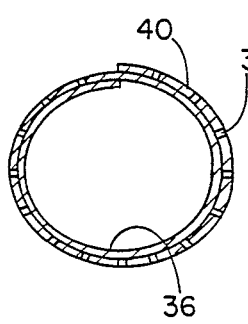
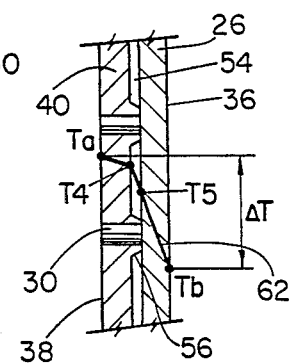
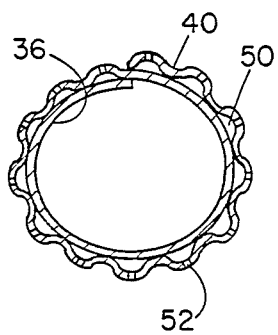
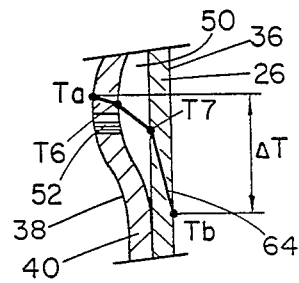
FIG. 7    FIG. 7A    FIG. 8    FIG. 8A
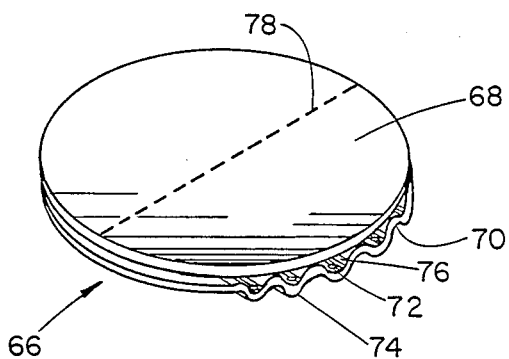
FIG. 9

FOOD WRAPPER ARTICLE

FIELD OF THE INVENTION

This invention relates to foodstuffs and, more particularly, to a form of such foodstuffs in the nature of a fried food roll as well as methods of preparation of same.

BACKGROUND OF THE INVENTION

A particular form of deep fried foodstuff and method of preparation thereof has long been known in various cultures, often commonly taking the form of the familiar fried pie, eggroll, and pastries of various sorts. In the making of such articles, it is common to provide a filling of some sort such as a meat or shrimp and cabbage mixture, fruit, other dessert filling or the like, which is sealed within an edible wrapper in the form of a pastry shell, flour pasta wrapper, or some other skin or membrane. The wrapper and filling therein are thence immersed in a hot cooking oil until the wrapper is cooked to a desired crispness while at the same time also heating the filler as desired.

A problem associated with such fried foodstuffs has long plagued even the most knowledgeable and skillful of food preparers, the problem being to provide the necessary heating of the inner filling while at the same time insuring that the wrapper becomes as crisp as possible. Several underlying and quite subtle problems have been uncovered in the discoveries of the present invention which have contributed to the difficulties of others in achieving this objective. Moreover, such problems have explained why the fried food industry has accordingly invested substantial amounts of time, money and effort in seeking solutions to these problems to no avail.

It is highly desirable in the preparation of such fried foods of the instant invention to accomplish the frying process in a short period of time. In this manner, the desired crispness of the outer shell may be obtained before the inner filling dries out and the food article becomes undesirably saturated with cooking oil. Fillings are, however, typically quite moist. The latent heat of vaporization of this moisture in the fillings unfortunately conventionally has resulted in larger frying times being required to get the outer shell to a temperature hot enough to crisp and to compensate for the steam released from the filling. Unfortunately, this in turn means that the wrapper either never has enough time to heat and crisp up if the filling is to be cooked to the desired temperature and moistness or, in the alternative, if the wrapper in fact does crisp as desired, the filling frequently was discovered to be too dry.

The aforementioned problem is exacerbated with the advent of modern cooking techniques embodied in microwave ovens. Such ovens have the well known property of heating the center of foods hotter than the outer portions. In the case of fried food rolls of the subject invention, it is highly desirable to be able to reheat such food rolls quickly with microwave cooking, thus giving rise to a large frozen food industry for this type of foodstuff, for example. However, due to the aforementioned characteristic of microwave heating, the moist center filling will be substantially heated first, thus releasing any latent moisture in the form of steam to the surrounding pre-fried wrapper. This substantially reduces the crispness of the outer wrapper in the case of conventionally prepared fried food rolls. Accordingly, particularly in the case of microwave reheating of fried food rolls, an outer wrapper or crust having an extremely crisp property was highly sought after in order to compensate for the effect of the steam released in the microwave reheating process.

These and other features, objects, and advantages of the present invention will become apparent from the following detailed description of a preferred embodiment, wherein reference is made to the Figures in the accompanying drawings.

SUMMARY OF THE INVENTION

A fried food article having improved crispness. Inner and outer pastry shells are provided, the inner shell sealedly containing a desired moist filling, and the outer shell being disposed thereabouts. Means are provided for decreasing deep frying time to achieve desired outer shell crispness while avoiding undesirable drying out of the filling. In one embodiment, such means takes the form of a plurality of apertures in the outer shell to facilitate frying oil substantially contacting both the inner and outer surfaces of the outer shell and for venting moisture from the filling. In an alternate embodiment, spacing means are provided alone or in combination with the apertures providing spaces between the inner and outer shells for heat insulation therebetween in the former case, and additional space for hot oil in the latter case, both to enhance the resultant crispness of the food article upon frying. The spacing means may take the form of corrugations in the inner and/or outer shells.

BRIEF DESCRIPTION OF THE DRAWINGS

FIG. 5 is a cross-sectional view of a conventional food roll of the prior art.

FIG. 5A is a temperature profile of the wall of the food roll depicted in FIG. 5 during the frying process.

FIG. 6 is a cross-sectional view of the food roll of the present invention.

FIG. 6A is a temperature profile of the wall of the food roll depicted in FIG. 6 during the frying process.

FIG. 7 is a cross-sectional view of another embodiment of the food roll of the present invention.

FIG. 7A is a temperature profile of the wall of the food roll depicted in FIG. 7 during the frying process.

FIG. 8 is a cross-sectional view of the food roll of the present invention depicted in FIG. 4 taken along line 8—8.

FIG. 8A is a temperature profile of the food roll depicted in FIG. 8 during the frying process.

FIG. 9 is an isometric view depicting another embodiment of a wrapper suitable for preparation of a food article of the present invention.

DETAILED DESCRIPTION OF THE PREFERRED EMBODIMENT

Figure 1:
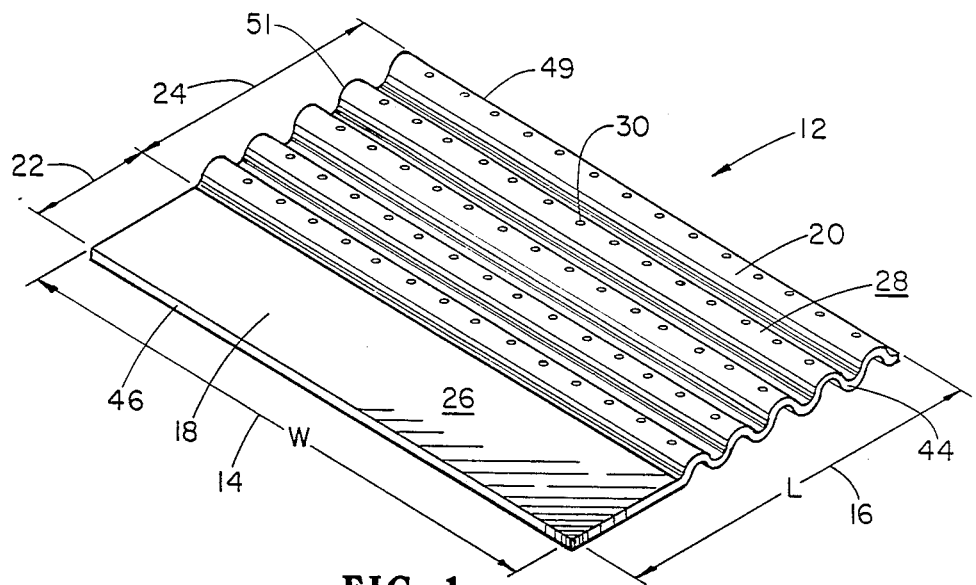
FIG. 1 is an isometric view of a wrapper employed in producing a fried food roll of the present invention, depicting a first step in the preparation of such rolls.
Figure 2:
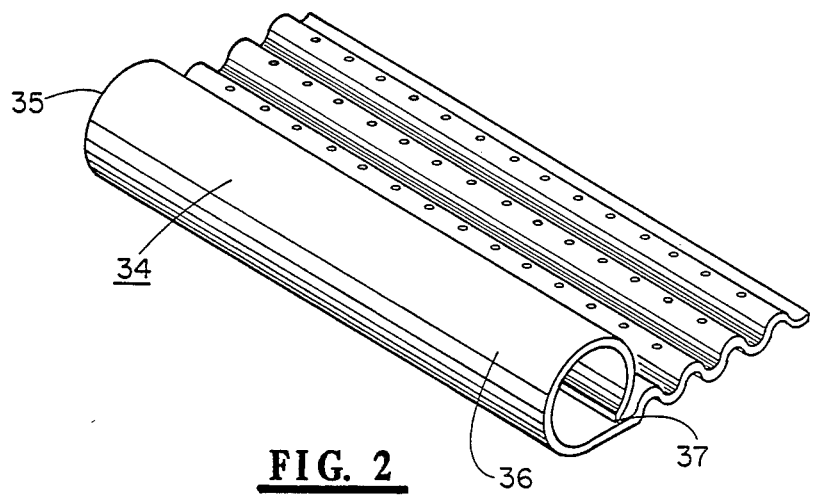
FIG. 2 is an isometric view of the wrapper of FIG. 1 at a second step in the preparation of the food roll of the present invention.
Figures 3, 4:
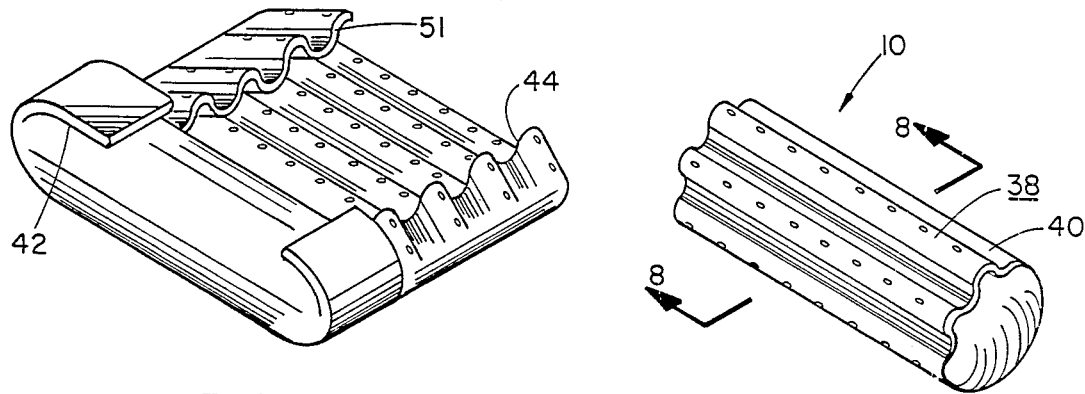
FIG. 3 is an isometric view of the wrapper of FIG. 1 at a third step in the preparation of the food roll of the present invention.
FIG. 4 is an isometric view of the wrapper of FIG. 1 at a fourth final step in the preparation of the food roll of the present invention.

With reference to FIGS. 1-4, first a method for preparing a fried food roll 10 of the present invention depicted in FIG. 4 will be given as well as a description of a preferred embodiment of an edible wrapper 12 employed in the preparation of such a food roll 10. This will be followed in turn with a discussion of various alternate embodiments of the wrapper 12 and the resultant thermodynamic consequences and properties thereof during the frying process with reference to FIGS. 5-8 and their corresponding temperature profiles of FIGS. 5A-8A. Next this will be followed by a discussion of yet an additional embodiment of an edible wrapper 66 depicted in FIG. 9 also suitable for preparing a fried food article in accordance with the teachings of the present invention.

First, with respect to FIG. 1, there will be seen depicted therein an edible wrapper 12 in a first position ready for the subsequent steps depicted in FIGS. 2-4 in the preparation of the fried food roll 10 of FIG. 4. With respect to the wrapper 12, it will be noted that such wrappers are variously referred to in the art not only as wrappers, but skins, shells, membranes, flour pastas, eggroll shells, pastry shells, and the like, all of which will be hereinafter referred to generically as wrappers or shells. Typically, such wrappers are comprised of a thin soft layer of edible material often made of flour, water, and other ingredients well known in the art, and having the property that the wrapper is flexible in its initial state, but upon frying, becomes crisp. Such wrappers 12 often are available in pre-formed shapes as desired, a representative commercially available example well known in the art which is used in the preparation of conventional Chinese eggrolls being known as Ban Yuan. Such wrappers 12 moreover typically have a nominal thickness of 1/32-1/16 of an inch and phonetical in Chinese are referred to as "tsun guan pee".

It will be appreciated from the foregoing that the invention is not intended to be limited to any particular composition of matter of the wrapper, such composition varying widely and being well known in the art which is nevertheless suitable for the frying process in the manner hereinafter described. Moreover, it will further be appreciated that the invention admits of any number of general shapes of the wrapper 12 and is accordingly in like manner not intended to be so limited in the rectangular shape depicted in FIG. 1. Accordingly, such wrappers 12 suitable for the hereinafter described process and preparation of fried food rolls in accordance with the present invention may take the form of circular or other geometric shapes in their initial form as desired and as will become clearer hereinafter. Still further, it will be appreciated that the steps depicted in FIGS. 1-4 for preparing one form of the invention in a Chinese eggroll have shown the wrapper 12 being rolled in a general longitudinal direction. However, it will be appreciated that in a more conventional preparation of a Chinese eggroll for example, the design of the wrapper 12 may be modified so that the wrapper may be rolled diagonally as will also hereinafter be made clearer with reference to FIGS. 1-4.

Referring now in more detail to FIG. 1, the wrapper 12 will be more particularly described. In the embodiment depicted therein, the wrapper 12 will have a width 14 and a length 16 as desired, thus defining a generally rectangular shape. At one end a generally flat inner shell portion 18 is defined, with the remainder of the wrapper 12 being comprised of an outer shell portion 20 having different characteristics being hereinafter described. With respect to the length 16 of the wrapper 12, the inner shell portion 18 may desirably have an inner shell length of 30-40% of the length 16, with the balance of 70-60% of the length 16 being comprised of the outer shell length 24. The inner shell portion 18 of the wrapper 12 defines an upper first inner surface 26 while, in like manner, the outer shell portion 20 of the wrapper 12 defines an upper second inner surface 28.

With reference to the outer shell portion 20, an examination of FIG. 1 indicates that this outer portion 20 may preferably include a plurality of apertures 30 extending therethrough, such apertures desirably having an average width or diameter (in the case of circular apertures) ranging desirably between 1/30-1/10 of an inch and further desirably numbering from about 20-45 holes per square inch. In the embodiment depicted in FIG. 1, these apertures 30 may be seen to be spaced fairly regularly, however, it will be appreciated that this is not required and they may in fact be more randomly distributed. Such apertures 30 will preferably substantially extend through the wall thickness of the outer shell portion 20. It will be recalled from the foregoing that the filling sealedly contained by the inner shell portion 18 is preferably moist relative to the material radially outwards therefrom. One consequence of this, particularly with respect to microwave reheating of the food roll 10 is that this moisture may be released from the inner shell 36 (particularly due to the microwave heating phenomenon of heating from the center outwards). In the embodiment of the present invention wherein the outer shell is substantially sealed about the inner shell, a problem accordingly exists in venting this vaporized moisture. Thus, yet an additional purpose of the apertures 30 may be seen in permitting this vaporized moisture to escape outwards of the outer shell.

Still referring to the outer shell portion 20 of the embodiment of the wrapper 12 depicted in FIG. 1, such outer portion 20 will further be seen to include a plurality of corrugations 32, such corrugations 32 also being described in the alternative in various manners such as convolutions, grooved pleats, rounded grooves, fluting, or the like, and being generically hereinafter referred to as corrugations 32. Such corrugations 32 are shown to extend in a generally parallel fashion perpendicular to the first and fourth edges 44 and 51 and generally parallel to the second and third edges 46 and 49, respectively, of the wrapper 12. However, the invention is not intended to be so limited, and these corrugations 32 may, if desired, each extend in random directions or parallel directions other than that depicted as, for example, in the case wherein such corrugations 32 might extend in directions generally diagonal to the second and third edges 46 and 49 or perpendicular thereto.

Still referring to the wrapper 12 depicted in FIG. 1, it will further be noted that whereas the outer portion 20 is shown to include in combination apertures 30 and corrugations 32, as will hereinafter be discussed in greater detail, while this may be a preferred form of the wrapper 12, the benefits and advantages of the present invention may be obtained by provision of apertures 30 alone or corrugations 32 alone.

In the formation of a fried food roll 10 in accordance with the present invention, the wrapper 12 is first disposed in the first position depicted in FIG. 1 and a desired filling deposited on the first inner surface 26 forming the upper surface of the inner shell portion 18. As aforementioned, the invention is further not intended to be limited to any particular filing, and admits of use of any number of such fillings as desired. As but a few examples, a fruit compote may be deposited on the inner surface 26. In the alternative, in the case of a more traditional Chinese eggroll, a meat or shrimp and vegetable combination filling may be provided which might include cabbage. It will be appreciated that such fillings, being moist, will, without the improvements provided by the present invention, render it difficult to achieve a crisp outer skin. However, even in the case of the present invention, it has often been found desirable to somewhat reduce the otherwise high moisture content of the filling so as to avoid the necessity to compensate for the adverse affects of such moisture on the desired enhanced crispness of the outer shell. Accordingly, it has been found desirable to deep fry the meat or shrimp in such a meat/shrimp filling first so as to somewhat reduce the moisture prior to subsequent frying as will hereinafter be described.

Prior to depositing the desired filling on the first inner surface 26, although not necessary, it has further been found desirable to "paint" the inner surface 26 first with, for example, a raw egg yolk—egg white mixture. In this manner, when the inner shell portion 18 is rolled in the hereinafter described manner, such surface preparation will enhance the sealing of the filling within the inner shell portion to desirably seal in the moisture of the filling. It will thus be appreciated that inasmuch as the purpose of painting the inner surface 26 is to enhance sealing, the invention is not intended to be limited to painting of the surface 26 with the aforementioned egg mixture. Accordingly, any means such as any desired liquid well known in the art which serves to seal surfaces of the material comprising the inner shell portion 18 may be used in a manner well known in the art.

In like manner, it has further been found desirable to paint the third edge 49 of the outer shell portion 20 for the purpose of maintaining the roll in the final position depicted in FIG. 4. In this manner, when the wrapper 12 is wrapped in the desired fashion, this third edge 49 will also more desirably sealingly and/or retainedly engage other portions of the wrapper 12. Still further, as will also be hereinafter described in greater detail, it is a feature of the present invention to provide for separation between a first shell containing the filling and an outer shell disposed about the inner shell so as to facilitate the extra crisping effect on the outer shell. Moreover, also keeping with the teaching of the present invention, it is further desirable to facilitate the penetration of the hot frying oil between the outer surface of the inner shell and the inner surface of the outer shell, also for the just-described reason of enhancing crispness of the outer shell by means of facilitating penetration of the hot frying oil therebetween.

Accordingly, it has further been found desirable in some cases to paint the second inner surface 28 of the outer shell portion 20 with a material which will prevent the outer surface of the inner shell and the inner surface of the outer shell from adhering to one another as, a problem which was conventionally discovered to be present in food rolls of the prior art. Thus, the second surface 28 may desirably be painted with a cooking oil for this purpose, although this is not required. Alternatively, a "spacer" layer of lard for example substantially solid at room temperature, may be provided for this purpose disposed on the second inner surface 28.

Once the aforementioned steps have been accomplished, with reference to FIG. 2, the inner shell portion will thence be rolled in the direction of the length 16 so as to form an inner shell 36 about the filling. This step may be seen with reference to FIG. 2 wherein the wrapper 12 is thus in a second position. Due to the presence of the sealant material on the first inner surface 26, when the wrapper 12 is in the second position of FIG. 2, it will thus be appreciated that the first outer surface 34 of the inner shell portion 18 will contact the painted inner surface 26 of the inner shell 18 so as to effect the desired sealing of the filling within the inner shell 36.

Next, the ends 35 and 37 of the wrapper 12 will be folded towards one another so as to position the wrapper in the third position depicted in FIG. 3 thus forming folds 42 along the first and fourth edges 44 and 51, respectively, of the wrapper 12. Finally, with respect to FIG. 4, the rolling process will continue in the direction of the length 11 of the wrapper 12, resulting in a finished rolled fried food roll 10. In the finished roll 10, it will be noted that the second outer surface 38 of the outer shell portion 10 is thus radially outwardmost, and that this outer shell portion 20 has thereby formed an outer shell 40 about the inner shell 36. Moreover, due to the corrugations 32, this outer shell 40 has portions of its inner surface that are spaced radially outwards from the first outer surface 34 of the inner shell 36 for reasons to be hereinafter described.

It will be appreciated that the operation of FIGS. 1-4 is but one embodiment, and the invention admits to various other forms of the end product of the food roll 10. For example, it is not necessary that the folds 42 be effected. On the contrary, the rolling operation may continue without such folding, with the ends 35 and 37 being pinched off to seal the filler material therein when the wrapper 12 is in the second position of FIG. 2 prior to finishing the rolling operation. In yet an additional alternative, the rolling operation may continue from the wrapper 12 in the second position without such pinching until the entire wrapper is rolled, whereupon the ends 35 and 37 may thereafter be pinched off as desired to seal the filler therein.

Once the forming of the food roll 10 has been effected, the roll 10 may thereafter be deep fried in a relatively conventional manner, employing a frying oil such as shortening, lard, or the like. The oil preferably does not have a very low viscosity inasmuch as this will not favorably contribute to the desired crispness of the outer shell 40. In such a frying operation, it is desirable to have the frying oil temperature at a nominal temperature of 350° F.±30° F., and to immerse the food roll 10 in the oil for between 2½ to 4 minutes as desired so as to effect the crisping of the outer shell 40 and final cooking and heating of the filling disposed within the inner shell 36.

In some cases, the filling material may not be pre-cooked. In this case, it is desirable for the food roll 10 to be deep fried at a lower temperature and longer time than the aforementioned ranges which are typically more applicable to food rolls 10 wherein the filling has been pre-cooked. Accordingly, in the case of non-pre-cooked fillers, it may, for example, be typical to fry such food rolls 10 at a nominal temperature range of 250°-280° F. for a period longer than four minutes as, for example, for a nominal 5-6 minutes.

With reference now to FIG. 5, there will be seen depicted therein a cross-section of a food roll such as conventional Chinese eggroll of the prior art. In particular, it will be noted that due to the rolling of a conventional relatively flat wrapper having no corrugations or apertures extending therethrough, the outer surface of the inner shell 36 and the inner surface of the outer shell 40 are substantially in contact with one another. One of the reasons for painting the inner surface 28 of the wrapper 12 is to avoid such intimate contact to prevent the layers from sticking together. With reference to FIG. 5, a temperature profile during the frying process of a cross-sectional wall segment of the roll depicted in FIG. 5 is shown therein. Similar temperature profiles will be shown for cross-sections of different embodiments of food rolls 10 of the present invention with reference to FIGS. 6–8. With respect to all such temperature profiles, FIGS. 5A–8A given sufficient frying time, the outer shell temperature $T_a$ can be assumed to be the same for all temperature profiles, and, in like manner, the inner shell temperature $T_b$ may be assumed to be the same for all temperature profiles as well as the $\Delta T$ for FIGS. 5A–8A. This is because $T_a$ may be considered to be controlled by the frying oil temperature, and $T_b$ may be determined to be controlled by the latent heat of vaporization due to the moist filling. However, a comparison of FIGS. 5A–8A will reveal that the temperature profiles across the shells as well as in the air or oil gaps described, however, are quite different in each case.

Still referring to FIG. 5, the temperature profile 58 with respect to a conventional roll may be seen to be generally linear, with $T_1$, the temperature at the innerface between the outer surface of the inner shell and the inner surface of the outer shell to be roughly the average of $T_a$ and $T_b$.

Referring now to FIG. 6, a cross-section of a food roll 10 of the present invention may be seen depicted therein. In this case, the corrugations 32 may be seen giving rise to a plurality of spaces 50 between the inner shell 36 and the outer shell 40. However, it will be noted that the apertures 30 shown in the embodiment of the wrapper 12 have been omitted.

With respect to the corresponding temperature profile for a wall segment of the roll depicted in FIG. 6, it will be noted that the temperature profile 60 has a different shape than that of profile 58 of FIG. 5A. More particularly, due to the poor conductivity of the space 50, the temperature difference between $T_2$ (the innerface of the inner surface of the outer shell 40 and the space 50) and $T_3$ (the innerface of the space 50 and the outer surface of the inner shell 36) is relatively large, and hence $T_2$ becomes higher than $T_1$. This, in turn, means that the outer shell 40 can reach a hotter temperature quicker than that of the roll shown in FIG. 5. It will be recalled that this is desirable inasmuch as it is desirable to fry the outer shell as quickly as possible to reach maximum outer skin crispness before the filling contained within the inner shell has dried out.

With respect to FIG. 7, a cross-section of a food roll 10 of the present invention in a different embodiment is shown depicted therein. In this case, it will be noted that the corrugations 32 have been omitted whereas the apertures 30 have nevertheless been included. With respect to the corresponding FIG. 7A, the temperature profile 62 for a wall segment of this embodiment is different from that of FIGS. 5A and 6A. It will be noted that due to the provision of apertures 30, a plurality of lips 56 may be formed in the forming process of these apertures 30. One way in which this might be done is to provide for a die or stamp having a plurality of protrusions and a mating die facing these protrusions having apertures for receiving them. Upon placing a flat wrapper between the dies and moving the dies toward one another, the protrusions will extend through the wrapper and into the mating holes in registry in the opposing face of the opposite die. In this manner, the apertures will be formed in the wrapper. However, more importantly, these pluralities of lips 56 about the apertures 30 will thereby be formed by causing a portion of the wrapper to extrude into the holes in the die face. The importance of such lips 56 is that they will, in like manner to the corrugations hereinbefore described, cause the substantial portions of the inner surface of the outer shell 40 to stand off from the outer surface of the inner shell 36, thereby forming substantial spaces 54 in like manner to the spaced 50 formed by the corrugations in the other embodiments described herein. In this manner, hot frying oil is permitted to enter through the apertures 30 and penetrate into these spaces 54 thereby enhancing the quickness with which the outer shell 40 may be fried in the desired manner. This may be seen reflected in the temperature profile 62. Due to hot frying oil getting into the oil in the innerface between the two shells shown by the space 54, $T_4$ becomes even higher than $T_2$. In this case, $T_5$ is higher than $T_3$, providing yet a shorter frying time.

Finally, with respect to FIG. 8, this will be recognized as a cross-section of the eggroll formulated in accordance with the method described with respect to FIGS. 1–4, such cross-section being taken along line 8—8 of FIG. 4. Moreover, this cross-section will reveal that the combination of corrugations 32 and apertures 30 has been provided for. With reference to the corresponding temperature profile FIG. 8A, even more hot frying oil than in the case of the embodiment of FIGS. 7 and 7A may be permitted to enter the space 50, and hence $T_6$ is even higher than $T_4$.

With the foregoing in mind, it can thus be concluded that the averaged temperature of the outer shell 40 is the hottest for this latter embodiment. The averaged temperature for the outer shell 40 is next hottest with respect to the embodiment of FIG. 7, followed by the embodiment of FIG. 6, and finally the least desirable case in the embodiment of FIG. 5, the prior art. Accordingly, the embodiment of FIG. 8A will provide the crispest outer shell 40 for a given frying time, as desired.

It will be appreciated that in the foregoing description it has been assumed that the food roll 10 of the present invention will desirably take the form of an elongate roll. However, the invention is not intended to be so limited. The benefits of the separation between two layers of shells in resulting in a crisper outer shell than previously possible, may be accomplished by any number of shapes of rolls. To illustrate the point, yet an additional embodiment of the present invention may be seen depicted in FIG. 9. In this case, a wrapper 66 is provided having an inner wrapper layer 68 and an outer wrapper layer 70. The outer wrapper layer 70 may be seen to include, as desired, either the aperture 72 previously described, corrugation 74, or a combination thereof. The aperture 72 if formed as previously described either alone or the corrugation 74, or the combination thereof may provide the desired space 76 between the innerfacing inner surfaces of the inner and outer wrapper layers 68 and 70. Moreover, although the wrapper layers 68 and 70 have been shown to be in a generally circular shape, again, the invention is not intended to be so limited and the wrapper 66 may take any other desired geometrical shape as required. In use, the wrapper 66 will be provided with a filling as in the prior case which may be deposited on the upper surface of the wrapper layer 68. Thereafter, the wrapper 66 may be desirably folded along a longitudinal axis 78 whereby the outer circumferential areas of the inner and outer wrapper layers 68 and 70 may be desirably sealed by a press-fit which may also include a sealant material such as the aforementioned egg mixture deposited on the surface or outer edge of the inner wrapper layer 68. In this manner, an outer layer 78 is provided which stands off from the outer surface of the inner wrapper, thereby lending the desired result in the frying process which follows thereafter. In other words, the outer wrapper layer 70 may be fried very quickly to an extremely hot temperature to get the outer skin extremely crisp before the filling contained and sealed within the inner wrapper layer 68 is fried too long so as to become undesirably dry.

In various embodiments of the present invention, an inner shell is provided for sealedly retaining a filler, an outer shell disposed thereabouts, and a spacing means between the inner and outer shells. This spacing means will space apart the outer surface of the inner shell from the inner surface of the outer shell.

It will be appreciated, however, that this function of the spacing means may be provided in a number of forms. For example, the spacing function has been shown to be provided by corrugations in the outer shell. However, these corrugations may alternatively be in the inner shell or in both shells. Moreover, the spacing function also has been described herein as having been provided by inwardly protruding lips of apertures extending through the outer shell and/or by an oil or other coating or layer between the inner surface of the outer shell and the outer surface of the inner shell as, for example, in the case of the "spacer" layer of lard previously described which serves this function.

It will be appreciated that the invention admits of a number of other means for providing such spacing. For example, alternately, a corrugated intermediate layer of material may be provided for disposition between the outer surface of the inner shell and the inner surface of the outer shell for this purpose.

As yet an additional example, the first inner surface 26 may be provided at a corner of the wrapper 12 whereupon the filler material may be deposited. The corrugations 32 and/or apertures 30 may appear in an outer shell portion 20 across the remainder of the wrapper 12. In this embodiment, upon depositing the filler material on the corner version of the inner shell portion 18, the wrapper 12 may be rolled in a diagonal fashion, with pinching occurring either upon completion of the wrapping of the entire wrapper 12 or after rolling just the inner surface 26 portion to sealedly envelope the inner surface 26. Additionally, the edges may be folded in after completion of rolling of the inner surface portion in like manner to that of the embodiment shown in FIGS. 1–4.

Still referring to alternate ways to form the food roll 10 in accordance with the present invention, particularly with respect to smaller food rolls 10, an alternate folding and rolling procedure is desirable. In this case, upon depositing the filling on the inner surface 26, the outer corners of the inner shell portion 18 defined by the inner section of the first and fourth edges 44 and 51 with the second edge 46 are folded inwardly towards the center of the wrapper 12. The rolling operation thence continues until the outer shell portion 20 envelopes the inner shell formed by the rolled inner shell portion 18. Thereafter the ends 35 and 37 are pinched off as desired.

Still further, the invention contemplates mass production of such food rolls. In this case, it will be appreciated that it is not essential that the filler material be first deposited on the inner surface 26 of the wrapper 12. For example, once at least the inner shell 36 has been formed as depicted in FIG. 2, the filler may be injected into the interstices of the inner shell 36. Still further, in yet another embodiment, it may be desirable to form an inner shell 36 in continuous tube as, for example, by being extruded with the filler material being injected in the annular cavity thereby formed, with the inner shell either before or after such filling being cut to desired lengths. Similarly, the outer shell may be formed in a continuous tube fashion concentrically about the inner shell and pinched off at desired lengths to form the desired food roll 10.

It is therefore apparent that the present invention is one well adapted to obtain all of the advantages and features hereinabove set forth, together with other advantages which will become obvious and apparent from a description of the apparatus itself. It will be understood that certain combinations and subcombinations are of utility and may be employed without reference to other features and subcombinations. Moreover, the foregoing disclosure and description of the invention is only illustrative and explanatory thereof, and the invention admits of various changes in the size, shape and material composition of its components, as well as in the details of the illustrated construction, without departing from the scope and spirit thereof.

What is claimed is:

1. A food roll, comprising:
   a sealable inner shell having inner and outer surfaces;
   a filler sealedly retained within said inner shell and contacting said inner surface thereof;
   an outer shell disposed circumferentially about said inner shell and having inner and outer surfaces;
   spacing means cooperating with the outer surface of said inner shell and the inner surface of said outer shell for spacing a substantial portion of said inner surface of said outer shell from said outer surface of said inner shell to provide a plurality of spaces therebetween, while permitting a portion of said inner surface of said outer shell to contact said outer surface of said inner shell;
   a plurality of apertures disposed through said outer shell and cooperating with said spacing means for communicating between said inner and outer surfaces thereof;
   wherein said plurality of apertures provide fluid communication between said outer surface of said outer shell and said spaces between said outer shell inner surface and said inner shell outer surface for admitting frying oil therethrough when the food roll is cooked.

2. The food roll as described in claim 1, wherein said spacing means comprises a plurality of corrugations disposed in at least one of said inner and outer shells.

3. The food roll as described in claim 2, wherein said corrugations are disposed only in said outer shell.

4. The food roll as described in claim 1, wherein said spacing means comprises a plurality of lips disposed on the inner surface of said outer shell adjacent each of said plurality of apertures disposed therethrough, each of said plurality of lips projecting inwardly towards and in contact with said outer surface of said inner shell for providing said plurality of spaces.

5. The food roll as described in claim 1, wherein said plurality of apertures disposed in said outer shell have an average diameter within the range of about 1/30 to about 1/10 of an inch and number within the range of about 20-45 holes per square inch of surface are of said outer shell.

6. A wrapper for use in preparing a food roll, comprising:
- an inner shell portion formable into a sealable inner shell having inner and outer surfaces;
- an outer shell portion formable into an outer shell disposable about said inner shell and having inner and outer surfaces;
- the wrapper including spacing means cooperating with the outer surface of said inner shell portion and the inner surface of said outer shell portion for spacing a substantial portion of said inner surface of said outer shell from said outer surface of said inner shell to provide a plurality of spaces therebetween when said inner and outer shell portions are formed into the food roll; and
- a plurality of apertures disposed through said outer shell and cooperating with said spacing means for communicating between said inner and outer surfaces thereof;
- wherein said plurality of apertures provide fluid communication between said outer surface of said outer shell and said spaces between said outer shell inner surface and said inner shell outer surface for admitting frying oil therethrough when the food roll and wrapper is cooked.

7. The wrapper as described in claim 6, wherein said spacing means comprises a plurality of corrugations disposed in at least one of said inner and outer shell portions.

8. The wrapper as described in claim 7, wherein said corrugations are disposed only in said outer shell portion.

9. The wrapper as described in claim 6, wherein said spacing means comprises a plurality of lips disposed on the inner surface of said outer shell coincident with each of said plurality of apertures disposed therethrough, each of said plurality of lips projecting inwardly towards and in contact with said outer surface of said inner shell portion for providing said plurality of spaces.

10. The wrapper as described in claim 6, wherein said plurality of apertures disposed in said outer shell have an average diameter within the range of about 1/30 to 1/10 of an inch and number within the range of about 20-45 holes per square inch of surface area of said outer shell.

* * * * *